United States Patent [19]

DeRegnaucourt et al.

[11] Patent Number: 4,902,074
[45] Date of Patent: Feb. 20, 1990

[54] SPACER BLOCK

[75] Inventors: Robert A. DeRegnaucourt, Centerville; Lee Reichel, Kettering, both of Ohio

[73] Assignee: Dayton-Walther Corporation, Dayton, Ohio

[21] Appl. No.: 302,776

[22] Filed: Jan. 30, 1989

[51] Int. Cl.$^4$ .............................................. B60B 11/06
[52] U.S. Cl. ............................ 301/13 SM; 301/12 R; 301/10 R
[58] Field of Search .................... 301/9 R, 10 R, 11 R, 301/12 R, 13 R, 13 SM, 36 R

[56] References Cited

U.S. PATENT DOCUMENTS

| 1,816,380 | 7/1931 | Klaus et al. | 301/12 R |
| 1,999,531 | 4/1935 | Vanderveer | 301/12 R |
| 2,001,407 | 5/1935 | Burger | 301/12 R |
| 2,002,290 | 5/1935 | Krieg et al. | 301/12 R |
| 2,757,971 | 8/1956 | Malthaner | 301/36 R |
| 2,767,026 | 10/1956 | Walther, Sr. | 301/13 SM |
| 3,811,734 | 5/1974 | DeRegnaucourt et al. | 301/13 SM |
| 3,827,709 | 9/1974 | Williamson | 301/13 SM |
| 3,877,754 | 4/1975 | Walter et al. | 301/13 SM |
| 4,049,320 | 9/1977 | DeRegnaucourt et al. | 301/18 X |
| 4,142,569 | 3/1979 | Walther et al. | 301/13 SM X |

Primary Examiner—Russell D. Stormer
Attorney, Agent, or Firm—Mack D. Cook, II

[57] ABSTRACT

A spacer block for dual inner and outer tire carrying rims having a medial portion with a depending keeper tang for selective positioning within a keeper groove on the spoke ends of a wheel.

6 Claims, 11 Drawing Sheets 4,902,074

SPACER BLOCK

BACKGROUND OF THE INVENTION

The present invention relates to a spacer block seated on the spoke ends of a vehicle wheel for mounting dual rims.

More specifically, the invention relates to an improved spacer block, in the embodiment of a series of discreet spacers or in the embodiment of a full ring spacer, to separate and align dual inner and outer tire carrying rims.

The invention has been conceived for use on a cast spoked wheel design as generally disclosed in FIGS. 1 and 2 of expired U.S. Pat. No. 2,767,026, issued October, 1956 to the Dayton Steel Foundry Company on the application of George Walther, Sr.

The invention has been conceived as an improvement: for the separate detachable spoke units as disclosed in expired U.S. Pat. No. 1,999,531, issued April 1935 to Erie Malleable Iron Company on the application of Jewell W. Vanderveer; for the dual wheel spacer block as disclosed in expired U.S. Pat. No. 2,757,971, issued August 1956 to Gunite Foundries Corporation on the application of Sylvester A. Malthaner; and for the spacer block for a dual wheel assembly as disclosed in U.S. Pat. No. 3,837,709, issued Sept. 24, 1976 to Erie Malleable Iron Company on the application of Russell K. Williamson.

The co-inventor Robert A. DeRegnaucourt is also a named co-inventor of U.S. Pat. No. 4,049,320, issued September 1977, which became Re. 30,036, reissued June 1979, disclosing various combinations of dual tire carrying rims having radially inwardly projecting components adapted for dowled and tenoned engagement with various spacer embodiments carried by a fastening assembly axial component.

No search has been made for or on behalf of the inventors for prior patent art other than as specifically identified above.

SUMMARY OF THE INVENTION

It is an object of the invention to provide an improved spacer block seated on the spoke ends of a vehicle wheel for mounting dual rims.

More specifically, it is an object to provide an improved spacer block, in the embodiment of a series of discreet spacers, or in the embodiment of a full ring spacer, to separate and align dual inner and outer tire carrying rims.

Still further, it is an object to provide a spacer block concept permitting relatively unskilled mechanics to demount and remount dual tire carrying rims after routine repair, change or replacement by using compression forces and limited axial movement of the spacer block to generate uniform elastic deformation of the inner tire carrying rim during remounting.

Still further, it is an object to provide spacer blocks which will promote and maintain positive alignment between the dual inner and outer tire carrying rims and eliminate or substantially reduce lateral and radial runout or "rim wobble."

These and other objects of the invention, as well as the operating efficiencies and advantages thereof, will be apparent in view of the following drawings and specification.

In general, a spacer block for dual rims is for use on a wheel having a hub element, a plurality of spokes extending radially of the hub and an axially oriented surface on the outer end of each spoke extending inwardly from the face of a spoke to intersect a beveled inner rim mounting surface. The wheel also has a spacer block keeper groove on the outer end of each spoke formed radially inward from the axially oriented surface between a spoke face and a beveled surface. The wheel also carries a plurality of bolt supported clamp lugs for seating and locking the spacer block and the dual rims on the wheel. The spacer block is quadrilateral with two parallel sides defining a trapezoid. The spacer block has a medial portion with a radially inward surface coincident with an axially oriented surface on the outer end of each spoke. The parallel sides of the medial portion each carry axially projecting flanges adapted for engagement with rim gutter flanges on the outer and inner rims, during tightening of the clamp lugs. The spacer block medial portion further has a transverse bar with a depending tang projecting radially inwardly for selective positioning within one of the grooves on the end or in the tread portion of each spoke.

In the preferred combination of a wheel and spacer blocks according to the invention, the wheel has a relatively deep, as distinguished from shallow, groove which has a spacer block tang keeper or retainer function or purpose, as by an internal dovetailed surface, and a spacer block registry or positive stop function or purpose, as by a surface oriented substantially perpendicular to the rotational axis of the wheel. The spacer block has a tang which registers into the wheel groove and is axially slidable within the groove during mounting of the dual tire carrying rims. The tang has an axially inner surface initially spaced apart from the axially inner side of the groove, a dovetailed axially outer surface positioned concentric with the axially outer side of the groove, and a bottom surface spaced apart from the bottom of the groove.

In an alternative embodiment, the spokes of a wheel are hollow with an open end bounded by parallel axially oriented surfaces. The parallel surfaces extend inwardly to intersect a beveled inner rim mounting surface. The wheel further has a spacer block keeper stop projecting axially outwardly from the rear wall of a spoke and between the parallel surfaces. The spacer block medial portion has a transverse bar with a depending keeper tang for selective positioning against one of the keeper stops within the open end of each spoke.

IN THE DRAWINGS

Figure 11:
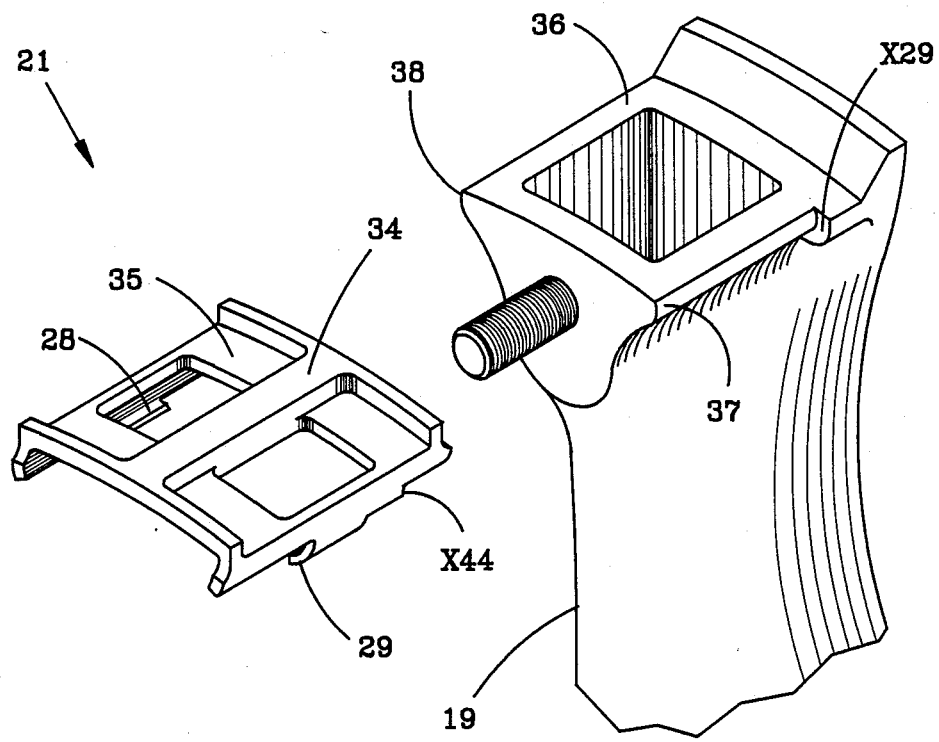

FIG. 11 is a fragmentary isometric view of a theoretical modification of the spacer block and wheel disclosed in U.S. Pat. No. 3,837,709.

DETAILED DESCRIPTION OF THE INVENTION

A spacer block according to the invention is referred to generally by the numeral 20. The dual tire carrying rims are referred to generally by the numerals 21 (outer) and 22 (inner). The tires mounted on the rims 21 and 22 are indicated by the letter T. A vehicle wheel for use with the spacer block 20 and dual rims 21 and 22 is indicated generally at 23.

Figure 1:
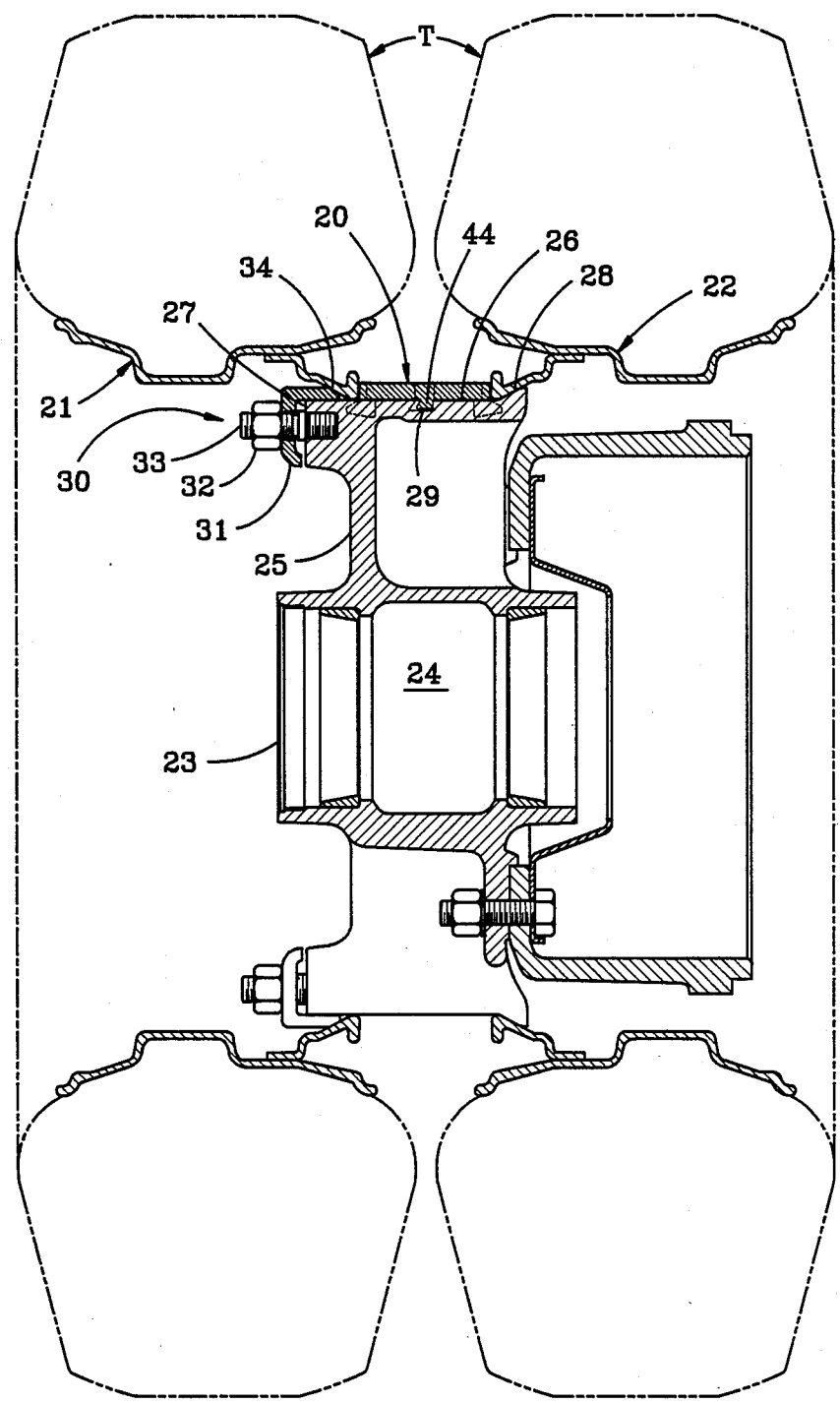
FIG. 1 is a fragmentary vertical cross-section showing spacer blocks (20) for dual inner and outer tire carrying rims (21 and 22) when mounted on a wheel (23) by fastening means (30)
Figure 2:
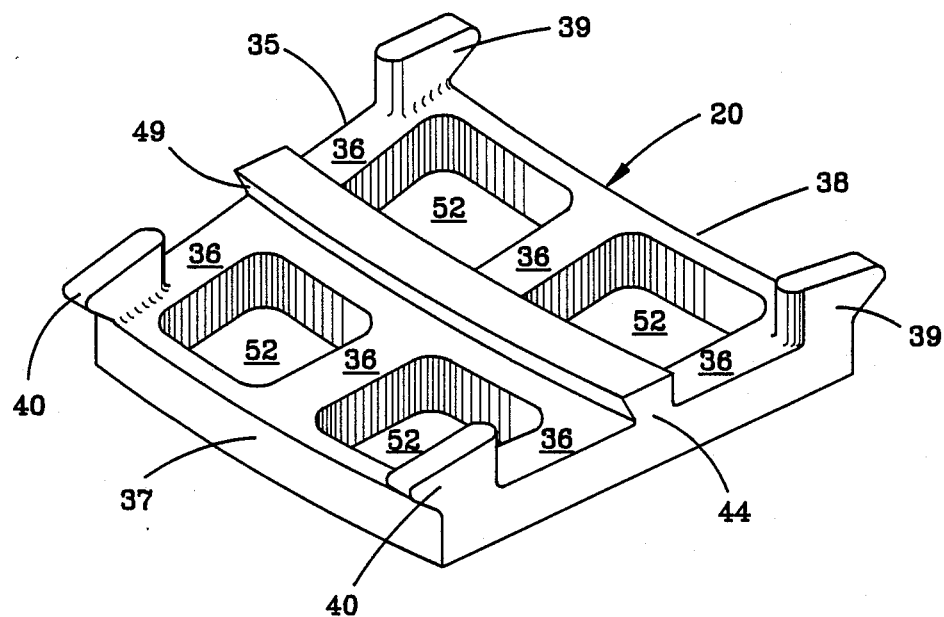
FIG. 2 is an isometric view of the spacer block (20) of FIG. 1.

A wheel 23 may be as generally disclosed in FIGS. 1 and 2 of expired U.S. Pat. No. 2,767,026. A wheel 23 has a hub element 24, a plurality of spokes 25 extending radially of the hub 24 and an axially oriented surface 26 on the end of a spoke 25. A spoke surface 26 extends inwardly from a spoke face 27 to intersect a beveled or radially inclined surface 28 for seating and mounting an inner rim 22.

A wheel 23 for use with a spacer block 20 has a spacer block keeper groove indicated at 29 on the closed end of a spoke 25. As shown, each keeper groove 29 is formed and precisely dimensioned, preferably by machining after casting, radially inwardly from the surface 26 and parallel to or concentric with each spoke bevel 28. The exact location of the keeper groove 29, as between a spoke face 27 and a beveled surface 28, is determined by the configuration of the radially inner surface of a spacer block 20, as further described.

A spacer block 20 and the dual rims 21 and 22 are seated and locked on a wheel 23 by fastening means indicated at 30. Each fastening means 30 comprises a clamp lug 31 held by a tightenable nut 32 threaded on a bolt or stud 33 projecting from a spoke space 27. Each clamp lug 31 has a beveled or radially inclined surface 34 for seating and mounting an outer rim 21.

Figure 4:
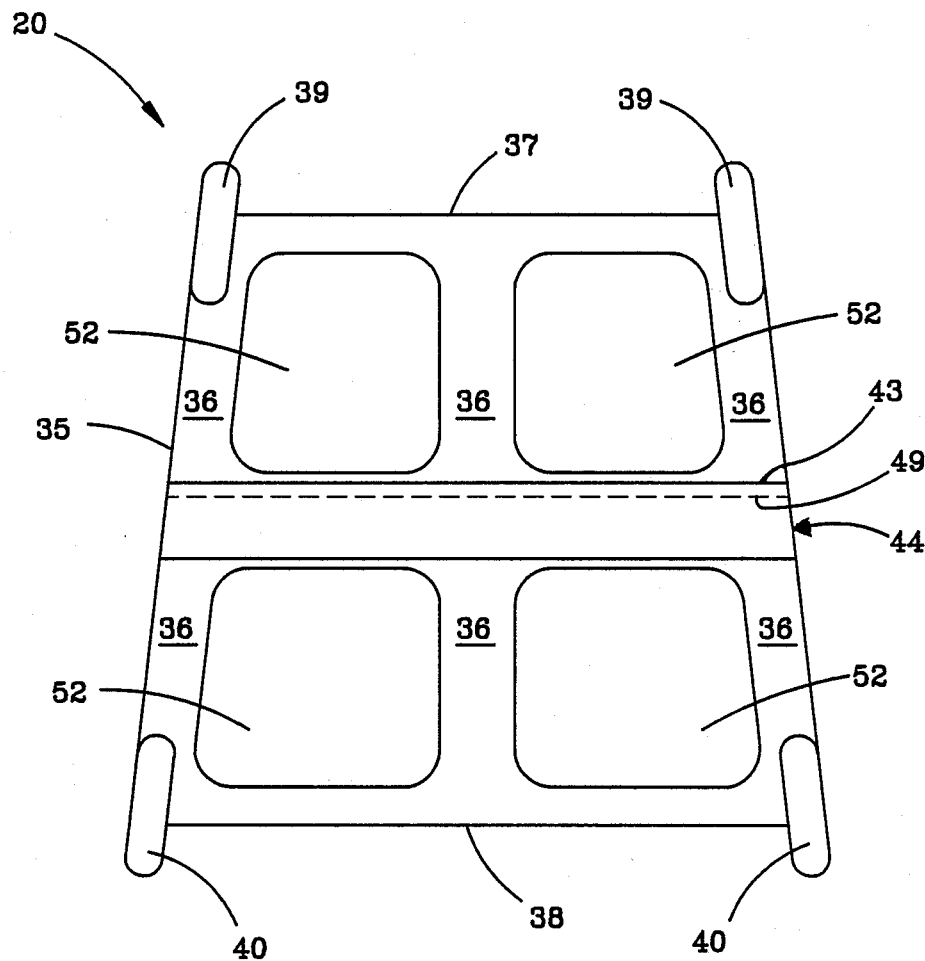
FIG. 4 is a bottom plan view of the spacer block (20)

As shown, a spacer block 20 is quadrilateral in plan view (see FIG. 4) with two parallel sides defining a trapezoid.

The spacer block 20 has a medial portion indicated at 35 with a radially inward surface 36 coincident with the curvature of an axially oriented surface 26 on the end of a wheel spoke 25. The parallel sides 37 and 38 of the medial portion 36 each carry axially projecting flanges 39 and 40 adapted for engagment with and seating under curvilinear side or rim gutter flanges 41 and 42 on the outer and inner rims 22 and 21, during tightening of the clamp lugs 31 of the fastening means 30 for mounting of the dual rims 21 and 22 on the wheel 23.

The spacer block 20 further has a transverse bar 43, formed substantially parallel to and between the parallel sides 37 and 38, extending across the medial portion 35. The transverse bar 43 extends radially inwardly of the medial portion surface 36 to form a depending tang or flange 44 for selective positioning relative to a groove 29 on the end of a wheel spoke surface 26, by a mechanic during rim mounting.

Figure 5:
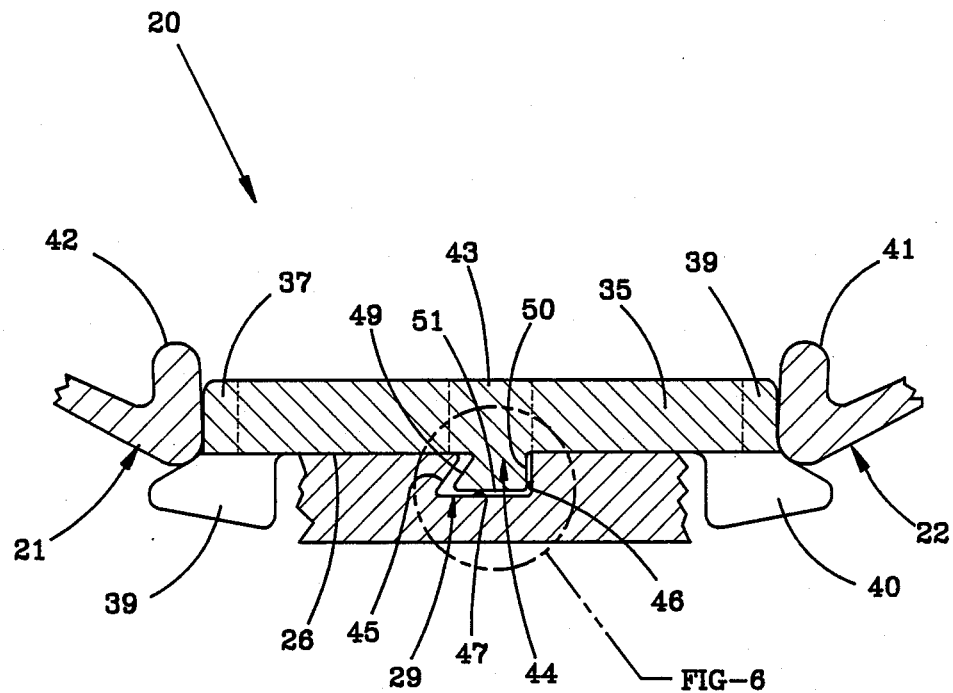
FIG. 5 is a sectional view of the spacer block (20)

Referring to FIG. 5, a wheel spoke end groove 29 functions in combination with a depending spacer block tang 44.

As shown, the groove 29 is shaped with axially outer and inner sides, 45 and 46. The outboard side 45 has a dovetailed surface. The inboard side 46 is oriented substantially perpendicular to the rotational axis of the wheel 23. The groove sides 45 and 46 are connected by a radially inward bottom 47. The tang 44 has a dovetailed axially outer surface 49 spaced apart from and inclined away from the groove side 45, an axially inner surface 50 initially spaced apart from the groove side 49 and, a bottom surface 51 space apart from the groove bottom 47.

Figure 6:
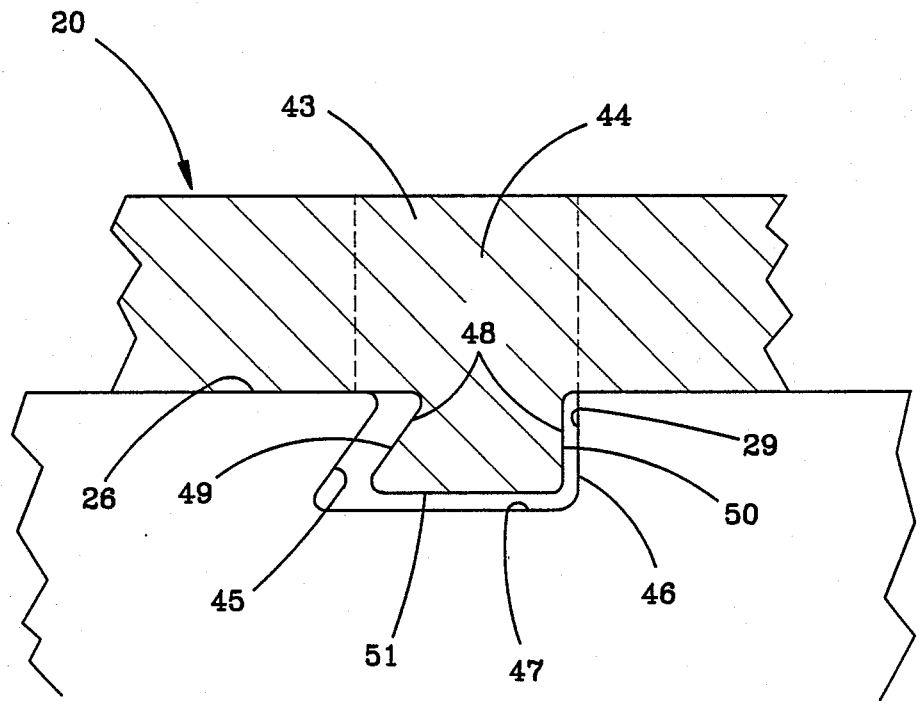
FIG. 6 is an enlarged fragmentary sectional view taken from within the chainline circle on FIG. 5 and intended to show the spacer block (20) selectively positioned within a keeper groove (29) on the end of a spoke (25)

The combination of wheel groove 29 and keeper tang 44 as shown in FIG. 6, has been determined to permit easy demounting and mounting of dual tire carrying rims 21 and 22 by a relatively unskilled mechanic. Also, the features of a cooperating wheel groove 29 and keeper tang 44 will assure that the dual rims when mounted, the clamp lugs 31 of the fastening means 30 being properly tightened, will not be subject to lateral runout or "rim wobble."

The combination of a wheel groove 29 and keeper tang 44, as best shown in FIGS. 5 and 6, cooperate as follows:

When an inner rim 22 is installed on a wheel 23, the spacer blocks 20 are installed one at a time by slipping projecting flanges 40 under the inner rim gutter lange 41 and rotating each spacer block 20 toward a wheel spoke 25 until tang 44 enters groove 29.

An inner rim 22 is restrained from moving axially outward by the bevel (dovetail) interlock of surfaces 49 and 45. Additionally, a spacer block 20 cannot fall out even by inadvertant rotation of a wheel 23.

When an outer rim 21 is installed on a wheel 23, the spacer blocks 20 are moved axially inward disengaging the bevel interlock of surfaces 49 and 45. The spacer blocks 20 are restrained from falling off by projecting flanges 39 positioned under the outer rim gutter flange 42. Final tightening of the fastening means 30 will move all spacer blocks 20 axially inward until tang surfaces 50 are in positive registry wheel groove surfaces 46.

As shown, a spacer block 20 may be formed with four symmetrically positioned interstices or openings 52, for weight reduction and/or air flow for brake cooling. Each spacer block opening 52 is located between a transverse bar 43 and keeper tang 44 and adjacent to a parallel side 37 or 38.

THE FULL RING SPACER EMBODIMENT

According to the invention, an improved spacer block 20 may be used on an improved wheel 23 as a series of discreet spacers, one for each wheel spoke 25 as required.

Figure 7:
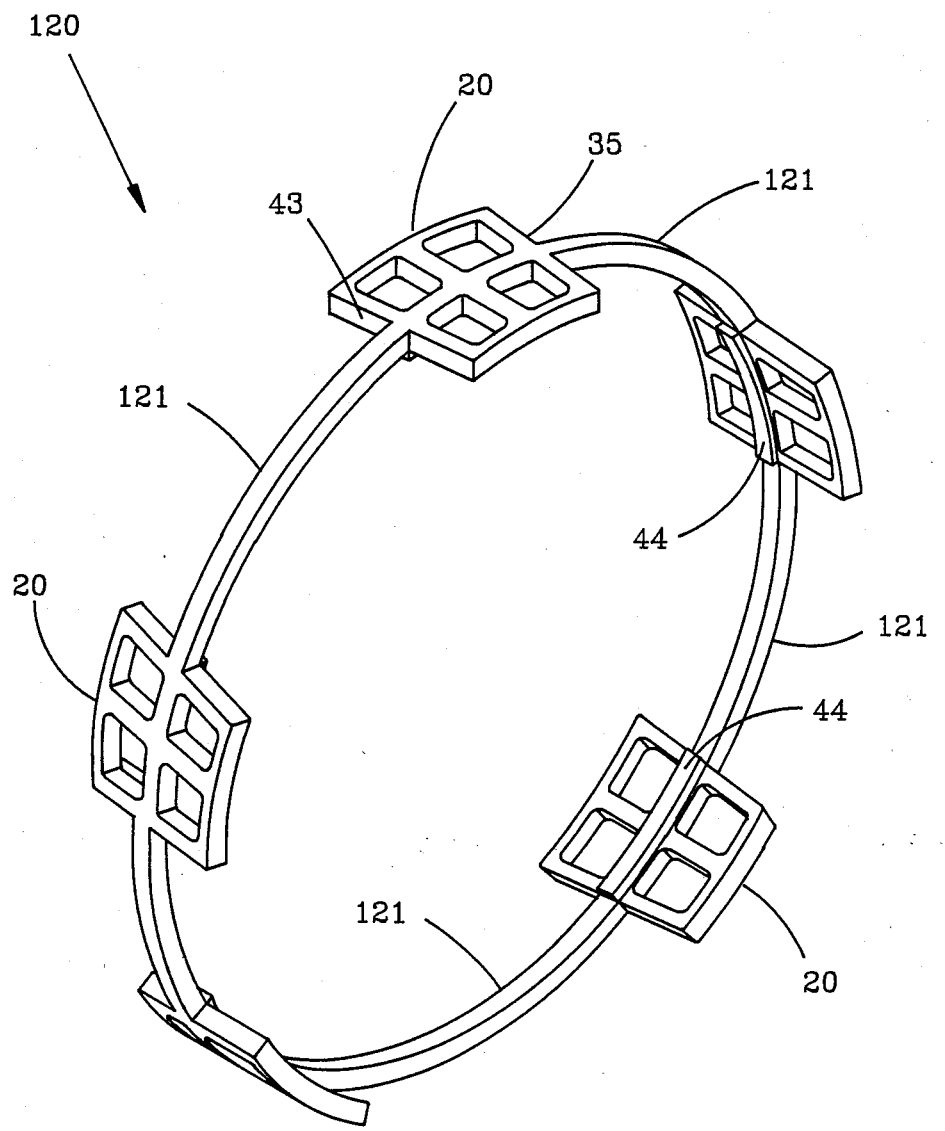
FIG. 7 is an isometric view of the full ring spacer (120)

Also according to the invention, a series of spacer blocks 20 may be used in the embodiment of a full ring or one-piece spacer 120. As shown in FIG. 7, a spacer 120 will have spacer blocks 20 interconnected by span segments 121 extending between the ends of each transverse bar 43 extending across a spacer block medial portion 35. The spacer block projecting flanges 39 and 40 are not required and therefore may be eliminated. The spacer block depending keeper tangs 44 will be equidistant, one for each wheel spoke 25.

A relatively unskilled mechanic will first position an inner tire carrying rim 22 concentrically around the beveled spoke surfaces 28. Next, the mechanic will position a ring 120 around the spoke end surfaces 26 with the individual spacer blocks 20 between the spokes 25. Then, the mechanic will rotate the ring 120 (in either direction) until each spacer block keeper tang 44 is symmetrically positioned within each wheel spoke end groove 29. Next, the mechanic may position an outer tire carrying rim 21 concentrically around the ring 120. Finally, the clamp lugs 31 of the fastening means 30 will be tightened by the mechanic for mounting of the dual rims 21 and 22 on the wheel 23. When the clamp lugs are properly tightened, the dual rims 21 and 22 will not be subject to lateral runout or "rim wobble."

ALTERNATIVE EMBODIMENT OF A DISCREET SPACER BLOCK

The inventors have determined that a prior art spacer block and wheel can be modified and adapted according to the invention to promote and maintain positive alignment between the dual inner and outer tire carrying rims and eliminate or substantially reduce lateral runout or "rim wobble."

Figure 8:
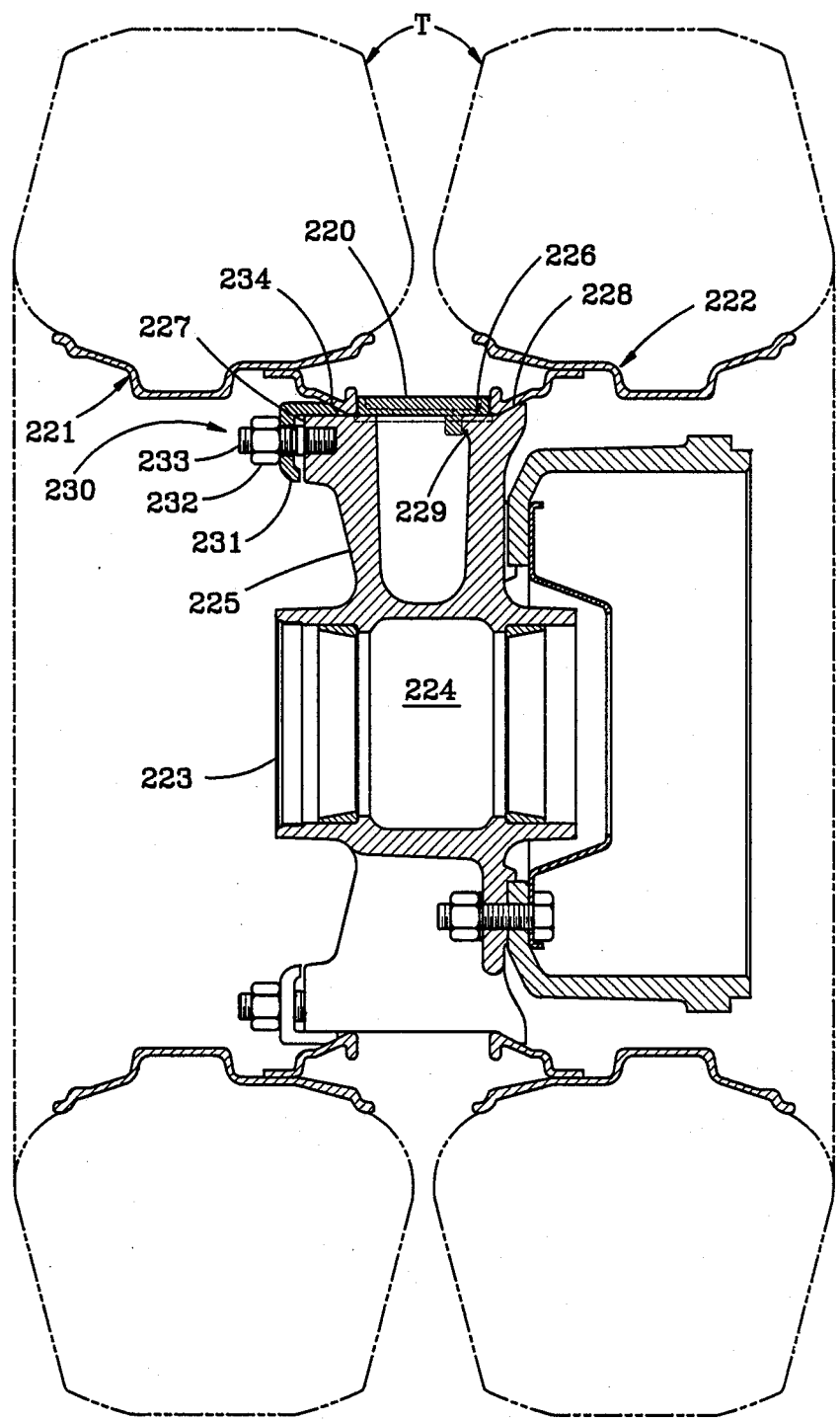
FIG. 8 is a fragmentary vertical cross-section showing a spacer block (220) for dual inner and outer tire carrying rims (221 and 222) when mounted on a wheel (223) by fastening means (230)
Figure 9:
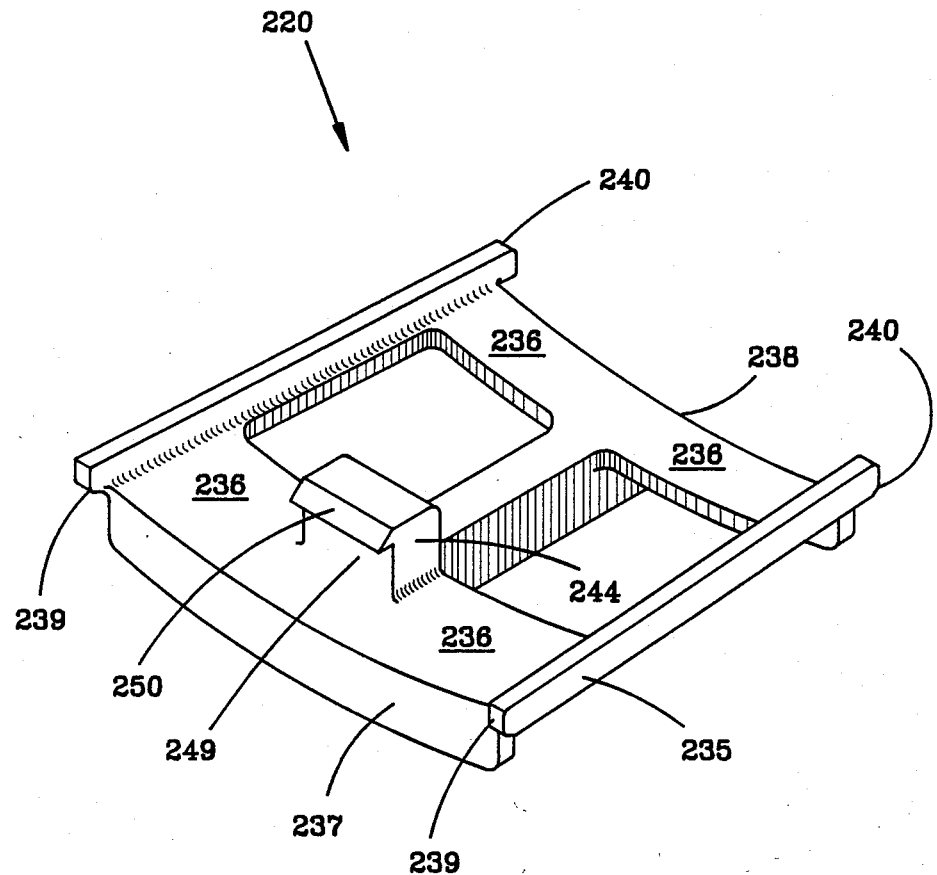
FIG. 9 is an isometric view of the spacer block (220) of FIG. 8.
Figure 10:
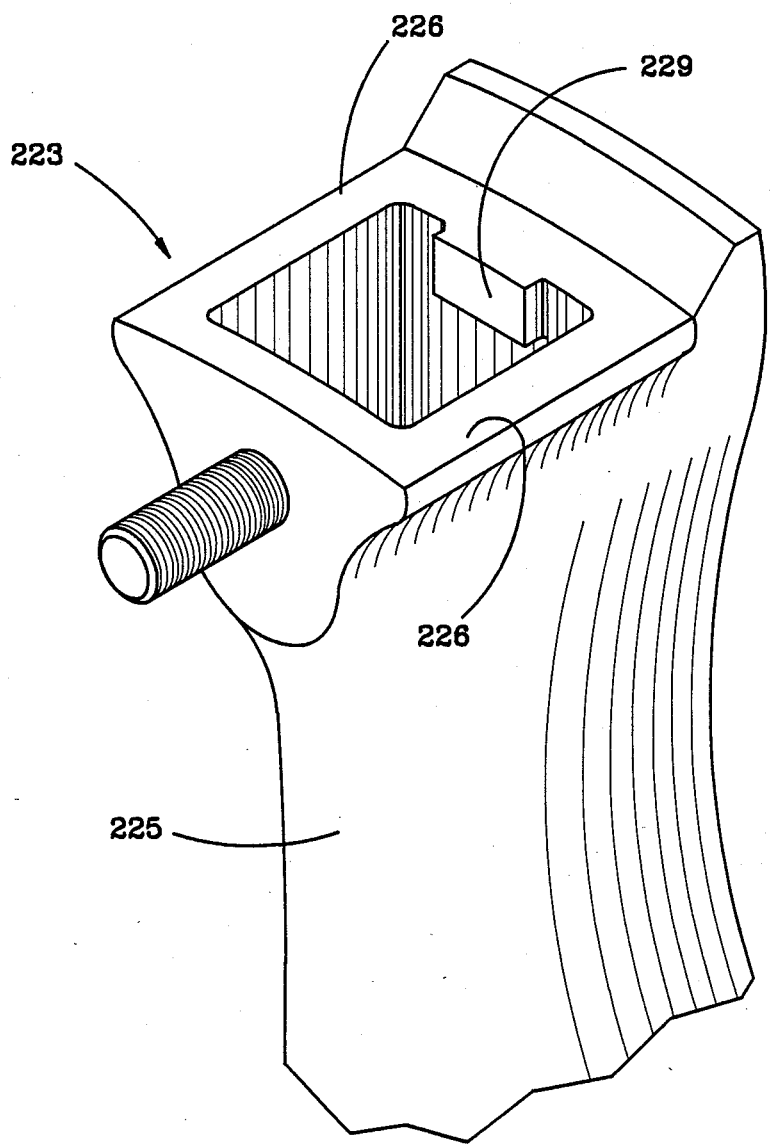
FIG. 10 is an isometric view of the open spoke end of a hollow spoke (225) particularly showing the spacer block keeper stop (229)

Specifically, and with reference to FIGS. 8, 9 and 10, the commercial embodiment for the spacer block 21 for use on a wheel 10 as disclosed in U.S. Pat. No. 3,837,709, issued Sept. 24, 1976 to Erie Malleable Iron Company on the application of Russell K. Williamson is marketed under the trade name EMI and the trademark ERMAX.

Referring to FIG. 8, the spacer block is referred to generally by the numeral 220. The dual tire carrying rims are referred to generally by the numeral 221 (outer) and 222 (inner). The tires mounted on the rims 221 and 222 are indicated by the letter T. A vehicle wheel for use with the spacer block 220 and dual rims, 221 and 222 is indicated generally at 223.

Figure 3:
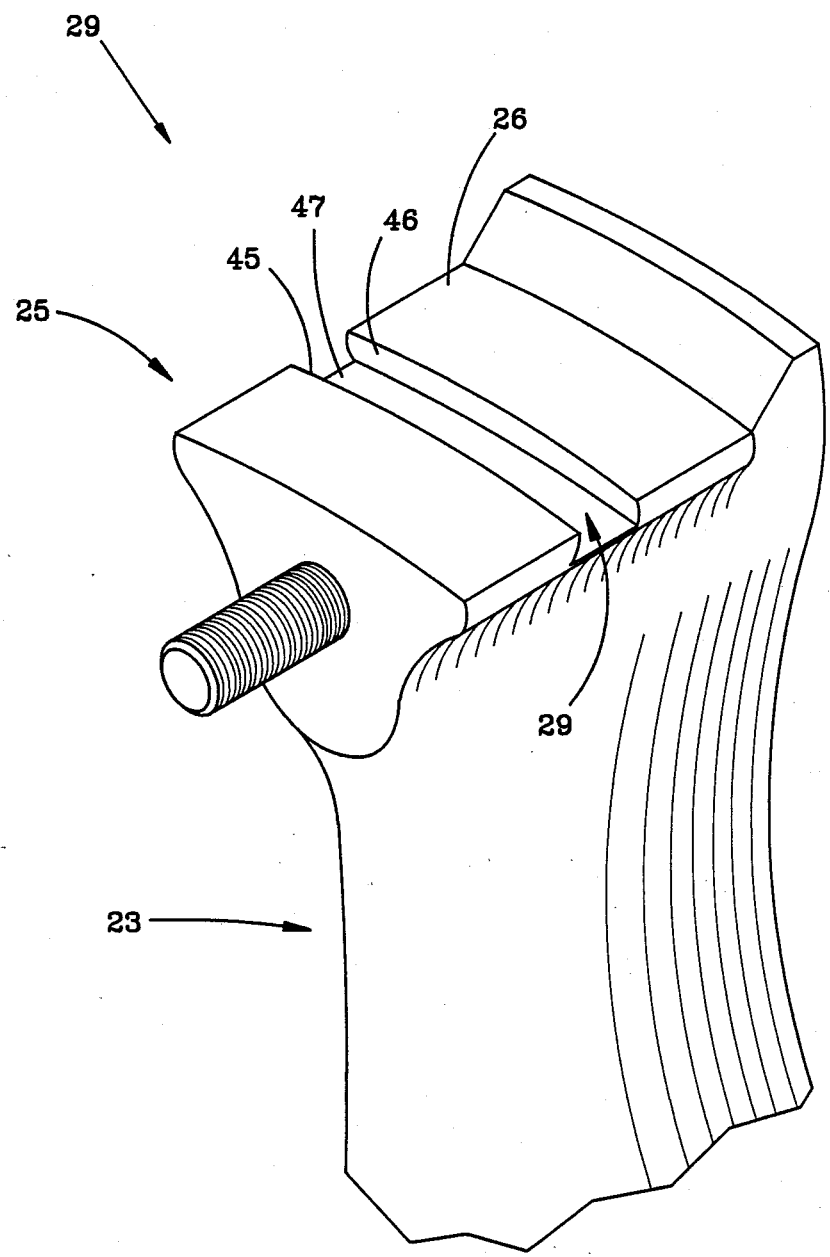
FIG. 3 is an isometric view of the spoke end (25) of the wheel (23) of FIG. 1, particularly showing the spacer block tang groove (29)

A wheel 223 may be as generally disclosed in FIGS. 1 and 2 of U.S. Pat. No. 3,837,709. A wheel 223 has a hub element 224 and a plurality of spokes 225 extending radially of the hub 224. As best understood by viewing FIG. 3 of No. 3,837,709, and referring to FIG. 10 the end of a spoke 225 is open or "hollow" bounded by parallel or dual axially oriented surfaces 226. The parallel spoke surfaces 226 extend inwardly from a spoke outer face 227 to intersect a beveled or radially inclined surface 228 for seating and mounting an inner rim 222.

Referring to FIG. 10, wheel 223 for use with a spacer block 220 has a spacer block keeper stop or boss indicated at 229 on the open end of a spoke 225. As shown, each keeper stop 229 is formed and precisely dimensioned, preferably by machining after casting, and projects axially outwardly from the rear wall of the hollow spoke 225 and between the dual spoke end surfaces 226. The exact length or axial extent of the keeper stop 229 is determined by the configuration of the radially inner surface of a spacer block 220, as further described.

A spacer block 220 and the dual rims 221 and 222 are seated and locked on a wheel 223 by fastening means indicated at 230. Each fastening means 230 comprises a clamp lug 231 held by a tightenable nut 232 threaded on a bolt or stud 233 projecting from a spoke face 227. Each clamp lug 231 has a beveled or radially inclined surface 234 for seating and mounting an outer rim 221.

Referring to FIG. 9, a spacer block 220 is quadrilateral in plan view with two parallel sides defining a trapezoid.

The spacer block 220 has a medial portion indicated at 235 with a radially inward surface 236 coincident with the curvature of the dual axially oriented surfaces 226 on the end of a wheel spoke 225. The parallel sides 237 and 238 of the medial portion 236 each carry axially projecting flanges 239 and 240 adapted for engagement with and seating against curvilinear side or rim gutter flanges 241 and 242 on the outer and inner rims 221 and 222, during tightening of the clamp lugs 231 of the fastening means 230 for mounting of the dual rims 221 and 222 on the wheel 223.

The spacer block 220 further has a transverse bar 243, formed transverse to and between the parallel sides 237 and 238, extending across the medial portion 235. The transverse bar 243 extends radially inwardly of the medial portion surface 236 to form a circumferentially extending keeper tang or flange 244 for selective positioning against a keeper stop 229 on the end of a wheel spoke 225, by a mechanic during rim mounting.

Referring to FIG. 10, a wheel spoke end stop 229 functions in combination with a depending spacer block keeper tang 244. The depending tang 244 has an axially inner surface 249 for mating engagement with the projecting end of a keeper stop 229. The tang inner surface 249 may terminate in a tapered hook end 250 spaced apart from and adapted to project beneath the stop 229.

The combination of wheel boss 299 and keeper tang 244 should permit easy mounting and demounting of dual tire carrying rims 221 and 222 by a relatively unskilled mechanic. Also, the features of a cooperating wheel boss 229 and keeper tang 44 will assure that the dual rims when mounted, the clamp lugs 31 of the fastening means 30 being properly tightened, should not be subject to lateral runout or "rim wobble."

MODIFICATIONS FOR A PRIOR ART SPACER BLOCK AND WHEEL

The inventors have further determined that a modification for a spacer block 21 and a wheel 10, as disclosed in U.S. Pat. No. 3,837,709 issued Sept. 4, 1976 to Erie Malleable Iron Company on the application of Russell K. Williamson, is theoretically possible. Such modification could promote and maintain positive alignment between the dual inner and outer tire carrying rims and eliminate or substantially reduce lateral and radial runout or "rim wobble."

According to U.S. Pat. No. 3,837,709, " . . . spacer blocks 21 are supported one on the outer end of each of the spokes 19. The spacer blocks 21 may be made with a plurality of ribs 33 joined by laterally extending ribs 34 connected by webs 35. The blocks have a relatively smooth under surface that rests on the out board ends 36 of the spokes and overhanging dovetailed flanges 28 and 29 underlie the enlarged ends 37 and 38 of the spokes. The ends 37 and 38 taper outwardly and the blocks are tapered from left to right as shown- in FIG. 6 so that the flanges 28 and 29 completely underlie the overhanging flanges 37 and 38 of the spoke ends." (Col. 2, ll. 14-26).

With the benefit of their invention as disclosed above, the inventors opine that beneficial use could be made by imparting a further function to the dovetail flanges 28 and 29 of the Williamson patent and by redesign of the wheel spokes 19.

Specifically, the sides 37 and 38 of the spoke ends could each be formed, during casting, with axially directed bosses or protuber-ances X 29. The spacer block side flanges 28 and 29 could be precisely dimensioned so that each will have an axially inner surface X 44 for mating engagement with the projecting ends of the side bosses.

FIG. 11 shows this possible modification of the Williamson patent; with additional identifying numerals as used in the prior patent.

CONCLUSION

The inventors have determined that their employer and assignee, Dayton-Walther Corporation, will be able to offer for sale to the trucking industry an improved POSALIGN ® or DAYTON ® spacer block-wheel combination. The inventors request that the scope of the patent claims be interpeted commensurate with the wording thereof, and that the invention be determined in view of the above described prior art and such other references as shall be cited by the USPTO and considered to be relevant prior art.

What is claimed is:

1. A spacer block for dual inner and outer tire carrying rims when mounted on a wheel:
    said wheel having a hub element, a plurality of spokes extending radially of said hub, and an axially oriented surface on the outer end of each spoke extending inwardly from the face of a spoke to intersect a beveled inner rim mounting surface;
    said wheel further having a spacer block keeper groove on said outer end of each spoke formed radially inward from said axially oriented surface between a spoke face and a beveled surface;
    said wheel further carrying a plurality of bolt supported clamp lugs for seating and locking said spacer block and said dual rims on the wheel after mounting, each said clamp lug having a beveled outer rim mounting surface;
    said spacer block having a medial portion with a radially inward surface coincident with an axially oriented surface on said end of each spoke and parallel sides each carrying axially projecting flanges adapted for engagement with and seating under rim gutter flanges on said outer and inner rims, during tightening of said clamp lugs;
    said spacer block medial portion further having a transverse bar with a depending keeper tang projecting radially inwardly from said transverse bar for selective positioning within a keeper groove on the end of a spoke.

2. A combination of a wheel and a spacer block according to claim 1 wherein said wheel has a spacer block keeper groove with a dovetailed axially outer side, and said tang further has an axially inner surface spaced apart from an axially inner side of said groove, a tapered axially outer surface spaced apart and inclined away from the axially outer dovetailed side of said groove, and a bottom surface spaced apart from the bottom of said groove.

3. A combination of a wheel and a plurality of spacer blocks according to claim 1 wherein each said spacer block is interconnected to an adjacent spacer block by span segments to form a full ring spacer and said axially projecting flanges are not required.

4. A full ring spacer according to claim 3 wherein each said ring segment extends between said spacer block transverse bars.

5. A spacer block for dual inner and outer tire carrying rims when mounted on a wheel:
    said wheel having a hub element and plurality of spokes extending radially of said hub, each said spoke being hollow and having an open end bounded by parallel axially oriented surfaces, said parallel surfaces extending inwardly from the outer face of a spoke to intersect a beveled inner rim mounting surface;
    said wheel further having a spacer block keeper stop projecting axially outwardly from the rear wall of a spoke and between said parallel surfaces;
    said wheel further carrying a plurality of bolt supported clamp lugs for seating and locking said spacer block and said dual rims after mounting, each said clamp lug having a beveled rim mounting surface;
    said spacer block being quadrilateral with two parallel sides defining a trapezoid;
    said spacer block having a medial portion with a radially inward surface coincident with the parallel axially oriented surfaces on said open end of each spoke, said parallel sides of said medial portion each carrying axially projecting flanges adapted for engagement with rim gutter flanges on said inner and outer rims, during tightening of said clamp lugs;
    said spacer block medial portion further having a transverse bar with a depending keeper tang projecting inwardly for selective positioning against a keeper stop within said open end of each spoke.

6. A combination of a wheel and a spacer block according to claim 5 wherein said spacer block keeper tang has an axially inner surface for mating engagement with said wheel keeper stop, said inner surface terminating in a tapered hook end spaced apart from and adapted to project beneath said keeper stop.

* * * * *